J. L. PAXSON.
Lumber-Tally.
No. 227,571. Patented May 11, 1880.
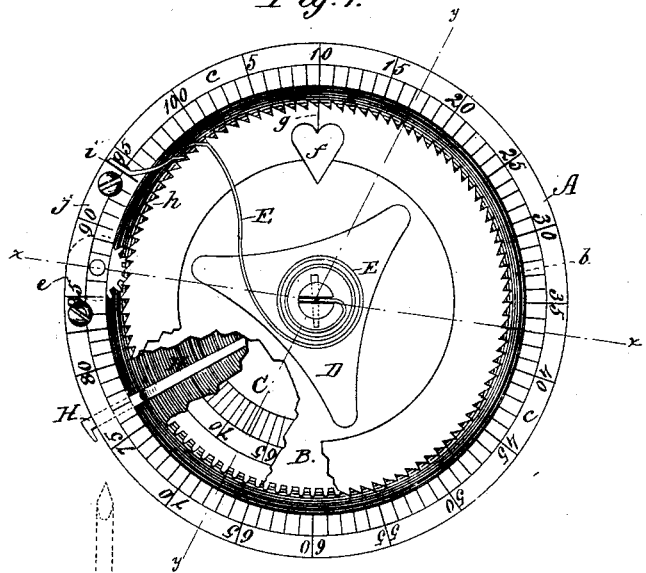
Fig. 1.
Fig. 4.
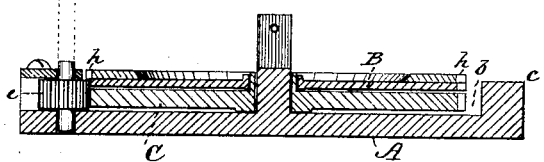
Fig. 2.
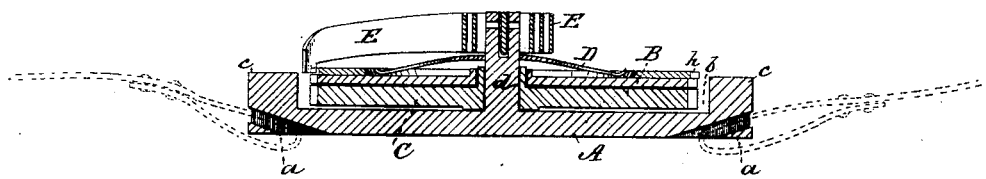
Fig. 3.
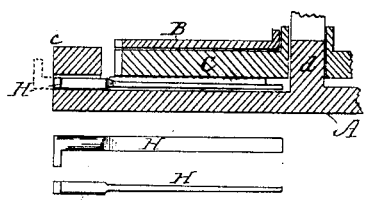
Fig. 5.
WITNESSES:
W. W. Hollingsworth
Edw. W. Byrn
INVENTOR:
John L. Paxson
BY
ATTORNEYS.
N. PETERS, PHOTO-LITHOGRAPHER, WASHINGTON, D. C.

UNITED STATES PATENT OFFICE.

JOHN L. PAXSON, OF NEW HOPE, PENNSYLVANIA.

LUMBER-TALLY.

SPECIFICATION forming part of Letters Patent No. 227,571, dated May 11, 1880.

Application filed February 6, 1880.

*To all whom it may concern:*

Be it known that I, JOHN LAMBERT PAXSON, of New Hope, in the county of Bucks and State of Pennsylvania, have invented a new and Improved Register for Tallying Lumber, &c.; and I do hereby declare that the following is a full, clear, and exact description of the same, reference being had to the accompanying drawings, forming part of this specification, in which—

Figure 1 is a plan view with a portion of the wheels broken away. Fig. 2 is a transverse section through the line $x\ x$. Fig. 3 is a transverse section through the line $y\ y$, showing the straps for fastening the device to the arm when used as a lumber-register. Fig. 4 is a device which may be used to convert the register into a speed-indicator. Fig. 5 shows detached views of device H and the manner of using it to readjust the disks.

My invention relates to an improved register adapted especially to the tallying of lumber, but applicable also to indicating the speed of machinery, or for adding a column of figures, or for measuring distances, &c., as hereinafter described.

My register is constructed upon the general principle of two or more parallel toothed wheels meshing with the same pinion or gear, and one of said wheels having one tooth more than the other, so that a revolution of the wheels together causes one of the wheels to move one space over the other wheel, to tally in units the number of revolutions of the said wheels.

The improvement consists in a case having a circular recess to receive two or more of said wheels, and having about said recess an indexed or graduated and raised rim, in combination with two or more of said differential wheels, one of which has a ratchet-toothed edge, a pinion meshing with said wheels, together with a spring, pawl, and actuating device for imparting motion to the wheels, as hereinafter more fully described.

In the drawings, A represents the case of the instrument, which is made circular and is provided with loop-holes $a\ a$ to receive straps, by means of which the device may be fastened to the arm, so as to leave both hands free. This case is formed with a circular recess, $b$, and a raised marginal rim, $c$, which latter is graduated from 1 to 100. Upon a spindle, $d$, rising from the center of the recess, is arranged a loose wheel, C, and just above it another loose wheel, B. Both these wheels have teeth upon their peripheries, one wheel having one hundred such teeth, and the other wheel having one hundred and one teeth. Both these wheels gear with a small pinion, $e$, arranged at the rim of the case to revolve in a plane parallel with B C, so that for every complete revolution of one of the wheels B and C one of them moves over the other the distance of one space, and by their differential position indicate in units the whole number of complete revolutions of the said wheels. The lower one, C, of these wheels has its face graduated from 1 to 101, corresponding to its teeth, and said figures appear through an opening, $f$, in the top wheel, which latter has a line or index, $g$, to point to the figures on the lower wheel and rim.

To turn the top wheel in adding or tallying, I fix about the spindle $d$ a volute spring, E, whose end extends to the edge of the top wheel, and is provided with a downwardly-projecting toe, which normally points to 100 on the rim. The upper wheel, B, also has, in addition to its gear-teeth, a second set of inclined ratchet-teeth, $h$, into which the toe of the volute spring may be made to engage. Now, in tallying or adding, the end of the volute spring is carried around from its stationary point 100 to the figure on the rim indicating the number of units to be added, carrying the wheel B with it that distance. The spring being then released, it moves of its own tension back to the stationary point 100 till it is re-required to be moved again. To prevent the top wheel from being too easily moved or carried past the desired point from momentum, I place a tripod friction-spring, D, on the central spindle, $d$, and cause it to bear against the top wheel. To keep the said top wheel also from moving backward, a pawl or detent, $i$, is fixed in the rim of the case and made to rest in the ratchet-teeth of the top wheel.

Now, for counting lumber, adding figures, &c., the device is used by moving the top wheel intermittently through the volute spring, as described. For recording the revolution of a shaft, either for indicating the speed of machinery, measuring distances, measuring gas, &c., the pinion e is removed by removing the plate j, which forms one of the bearings of the pinion, and inserting in the place thereof a similar pinion having a longer shaft, as shown in Fig. 4, which has a pointed and angular end, adapting it to engage with the rotating shaft of a piece of machinery when the device is to be used as a speed-indicator; or the shaft of the pinion e may be connected with the moving parts of a gas-meter, the wheels of a vehicle, &c.

After a certain measurement has been taken the wheels may be reset to the zero-point by the device H, which is a flat bar running radially to the center in a recess in the plate, and having a crank or handle at its outer ends. By turning the bar it acts like a cam to raise the upper wheel out of gear with the pinion, when, by holding the pinion-shaft, the upper wheel can be moved around independently of the lower wheel and both wheels then reset.

I do not claim, broadly, the differential wheels in connection with the pinion, nor the operation of the ratchet-teeth on the disk by a pawl engaging peripherally with the same and moving about a common center with the disk; but,

Having thus described my invention, what I claim as new is—

1. The register herein described, consisting of the recessed case A, having a raised and graduated rim, the differential toothed wheels B and C, one of which is provided with a graduated face, and the other of which has an opening through the same and ratchet-teeth $h$, the pinion $e$, engaging with the differential wheels, and means for rotating said wheels, all combined substantially as described.

2. The volute spring E, extended to the periphery of the ratchet-wheel, and provided with a tooth for operating the same, in combination with the case having a spindle, $d$, and the wheel B, having a set of ratchet-teeth, substantially as and for the purpose described.

3. The combination, with the recessed case A and the wheels B C, of the flat bar or pin H, arranged in the case and adapted to project by axial movement the wheel B out of engagement with the pinion, as described.

JOHN LAMBERT PAXSON.

Witnesses:
 ALEX. B. JOHNSON,
 AZARIAH MATHEWS.